Sept. 1, 1931.  E. J. DOWNING  1,821,794
SLIP ROTATION FOR ROCK DRILLS
Filed June 7, 1928
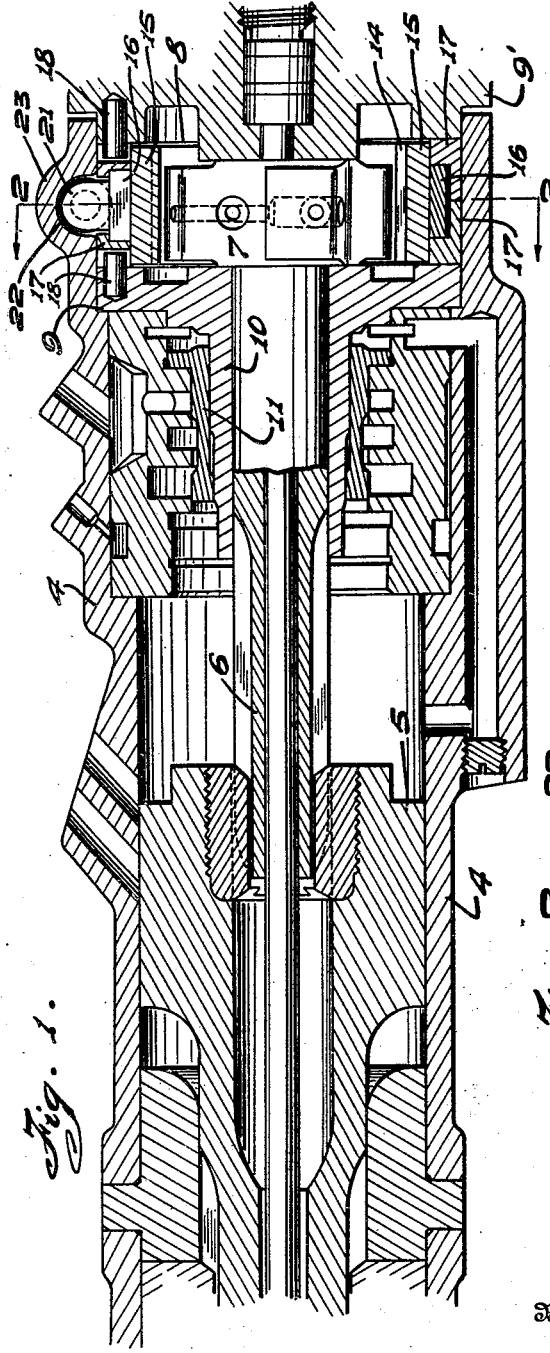
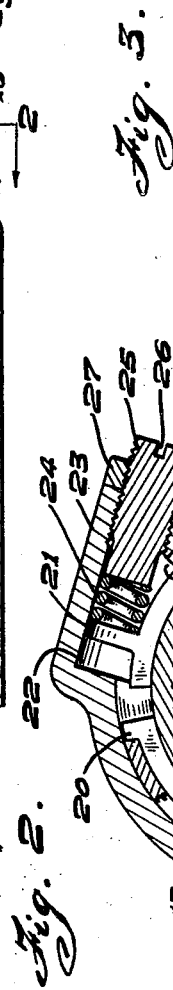
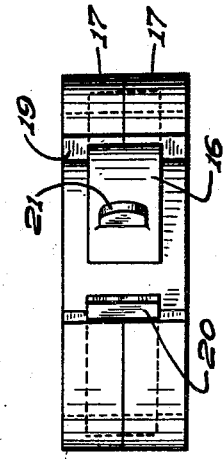
Inventor
EDWIN J. DOWNING
By
Attorney Patented Sept. 1, 1931

1,821,794

UNITED STATES PATENT OFFICE

EDWIN J. DOWNING, OF DENVER, COLORADO, ASSIGNOR TO GARDNER-DENVER COMPANY, OF DENVER, COLORADO, A CORPORATION OF DELAWARE

SLIP ROTATION FOR ROCK DRILLS

Application filed June 7, 1928. Serial No. 283,561.

The present invention relates to apparatus for normally maintaining the ratchet mechanism that effects the rotation of the piston of a rock drill, in operative condition, said apparatus, however, becoming inactive if the resistance to the rotation of the piston becomes abnormal.

The object is to provide a simple and effective mechanism of a novel nature for the above purpose.

In the accompanying drawings:

Figure 1 is a longitudinal sectional view through the preferred embodiment of the invention.

Figure 2 is a sectional view on the line 2—2 of Figure 1.

Figure 3 is a plan view of the clutch ring and the housing that encloses it.

In the embodiment disclosed, a cylinder member is shown at 4, and therein is a reciprocatory piston 5 adapted to rotate, and in its rotation effect the rotation of the tool-holding chuck in a well-known manner. The rotation of the piston is accomplished by means of a rifle bar 6 having at its rear end a head 7. This head is located in a chamber 8 formed in the rear end of the cylinder member 4. The front wall of the chamber is the flange 9 of a bushing 10, through which the rifle bar 6 passes. The bushing 10 also constitutes a support for an automotive valve 11 that distributes the motive fluid to the piston 5 to reciprocate it. The rear wall of the chamber 8 is formed by the rear head 9' of the cylinder member 4.

Said rifle bar head 7 in the disclosure constitutes one member or element of a ratchet mechanism, and as illustrated in Figure 2 it is provided with a plurality of pivoted pawls 12 urged outwardly by spring-pressed plungers 13. These pawls are adapted to engage the internal teeth 14 of another ratchet member or element that is in the form of a ring 15 in the chamber and surrounding the head 7. The periphery of the ring 15 constitutes a friction surface that is engaged by the inner surface of a clutch ring 16 located in the chamber 8. This clutch ring is placed in a housing comprising two flanged sections 17, forming between and within them an annular groove in which said clutch ring 16 is located. The housing 17 may be held against rotation by any suitable means. Thus in the embodiment disclosed, holding pins 18 engage the sections thereof.

The housing 17, as illustrated in Figures 2 and 3, is not a complete ring, but has an open portion 19 into which the ends of the clutch ring 16 extend, and one end of said ring is provided with outstanding lugs 20 that bears against the end of the housing. The other end of said ring is provided with a bearing lug 21. This lug 21 is located in a socket 22 formed by a transverse enlargement 23 of the cylinder member 4, and in said socket is a coiled spring 24 that bears against the lug 21 and is borne against by an adjusting plug 25, threaded into the outer end of said enlargement 23 (see Figure 2). The exposed end of the plug is provided with a slot 26 for receiving the bit of a screw driver and is also preferably provided with a lock nut 27.

Now it will be observed that the structure is such that the clutch ring 16 can be yieldingly clamped with any variable degree of tension upon the periphery of the ratchet ring 15 by adjusting the plug 25, which places more or less compression upon the spring 24, this spring reacting on the lug 21 of the movable end of said clutch ring. The frictional action is made such that the ring 15 is normally held against rotation during the operation of the piston 5. Consequently when the piston moves in one direction, the pawls 12 will be rotated in a direction to ride over the teeth 14 of the clutch ring and when the piston moves in the opposite direction, said pawls will engage behind certain of said teeth, holding the rifle bar against rotation and in turn causing the rotation of the piston during its longitudinal movement. Obviously therefore during normal drilling operations the piston is given a step-by-step rotation. This rotation is imparted to the tool-holding chuck and the tool is correspondingly rotated. The action is well known.

If, however, the drill steel becomes lodged so that it will not turn and there is danger of the tool itself being turned instead, the frictional holding action of the clutch ring 15 will be overcome and said clutch ring will be caused to rotate, thereby permitting the piston 5 to reciprocate without rotation and without rotating the cylinder member.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim, is:

1. In a fluid operated tool of the type stated, the combination with a cylinder member having a chambered rear end, of a reciprocatory piston in the cylinder member, a rifle bar engaged with the piston and having a head in the chamber, a ratchet ring surrounding the head and having a ratcheting connection therewith, a housing detachably fitted in the chamber around the ratchet ring, and having an internal groove, a contractile clutch ring in said groove that frictionally engages the ratchet ring, and means for causing the contraction of the clutch ring.

2. In a fluid operated tool of the type stated, the combination with a cylinder member having a chambered rear end, of a reciprocatory piston in the cylinder member, a rifle bar engaged with the piston and having a head in the chamber, a ratchet ring surrounding the head and having a ratcheting connection therewith, a housing detachably fitted in the chamber around the ratchet ring and having an internal groove, said housing having an opening through its peripheral portion, a contractile clutch ring in said groove that frictionally engages the ratchet ring, said clutch ring having one end extending outwardly through the open portion of the housing, and an adjusting screw extending through the cylinder member into the chamber and acting against the outstanding portion of the ring.

3. In a fluid operated tool of the type stated, the combination with a cylinder member having a chambered rear end, of a reciprocatory piston in the cylinder member, a rifle bar engaged with the piston and having a head in the chamber, a ratchet ring surrounding the head and having a ratcheting connection therewith, a housing detachably fitted in the chamber around the ratchet ring and comprising separable ring sections forming an internal groove and having spaced ends, a clutch ring in the groove frictionally engaging the ratchet ring and having outstanding ends between the ends of the housing ring sections, a plug adjustably threaded into the cylinder member, and a spring interposed between the plug and one end of the clutch ring.

In testimony whereof, I affix my signature.

EDWIN J. DOWNING.